United States Patent
Fletcher et al.

(10) Patent No.: US 10,855,493 B1
(45) Date of Patent: Dec. 1, 2020

(54) LOW-COMPLEXITY DOPPLER ESTIMATOR

(71) Applicant: SAMSUNG ELECTRONICS CO., LTD., Suwon-si (KR)

(72) Inventors: Paul N. Fletcher, Cambridge (GB); Fei Tong, Bassingmgbourn (GB)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/723,302

(22) Filed: Dec. 20, 2019

(51) Int. Cl.
*H04L 25/03* (2006.01)
*H04L 25/02* (2006.01)
*H04L 27/26* (2006.01)

(52) U.S. Cl.
CPC ........ *H04L 25/0222* (2013.01); *H04L 25/022* (2013.01); *H04L 27/2671* (2013.01); *H04L 27/2678* (2013.01); *H04L 27/2688* (2013.01)

(58) Field of Classification Search
CPC . H04L 25/00; H04L 25/0202; H04L 25/0214; H04L 25/022; H04L 25/0222; H04L 27/2647; H04L 27/2671; H04L 27/2688; H04L 27/2678
See application file for complete search history.

(56) References Cited

U.S. PATENT DOCUMENTS

| | | | |
|---|---|---|---|
| 7,724,694 B2 | 5/2010 | Okada | |
| 7,768,963 B2 | 8/2010 | Alizadeh-Shabdiz | |
| 8,379,745 B1 | 2/2013 | Nabar et al. | |
| 9,083,419 B2 | 7/2015 | Alexander et al. | |
| 2008/0101215 A1* | 5/2008 | Tanaka | H04L 25/03159 370/210 |
| 2017/0134207 A1 | 5/2017 | Liu et al. | |
| 2018/0006687 A1* | 1/2018 | Porat | H04L 27/2621 |
| 2018/0146076 A1* | 5/2018 | Verma | H04L 1/0025 |
| 2018/0309605 A1 | 10/2018 | Liu et al. | |
| 2019/0013978 A1* | 1/2019 | Zhou | H04L 5/0044 |
| 2020/0084684 A1* | 3/2020 | Choi | H04L 5/0007 |

FOREIGN PATENT DOCUMENTS

KR 10-0531848 11/2005

OTHER PUBLICATIONS

Choi, et al., "A Maximum Likelihood Doppler Frequency Estimator for OFDM Systems", IEEE International Conference on Communications, 2006, pp. 4572-4576.
Park, et al., "Level Crossing Rate Estimation with Doppler Adaptive Noise Suppression Technique in Frequency Domain", 2003 IEEE, pp. 1192-1195.

* cited by examiner

*Primary Examiner* — Siu M Lee
(74) *Attorney, Agent, or Firm* — F. Chau & Associates, LLC

(57) ABSTRACT

An apparatus and method are provided for Doppler estimation of a signal received over a time-varying transmission medium, the method including receiving the signal over a channel of the time-varying transmission medium; sampling a magnitude of the received signal repeatedly over time; identifying unidirectional threshold crossings of the sampled magnitude about a threshold magnitude relative to a mean magnitude; measuring differences between the sampled magnitude and the threshold magnitude for the identified crossings; analyzing the measured differences over time; estimating the time-varying nature of the channel based on the analyzed differences; and transmitting a signal indicative of the estimated time-varying nature.

20 Claims, 13 Drawing Sheets

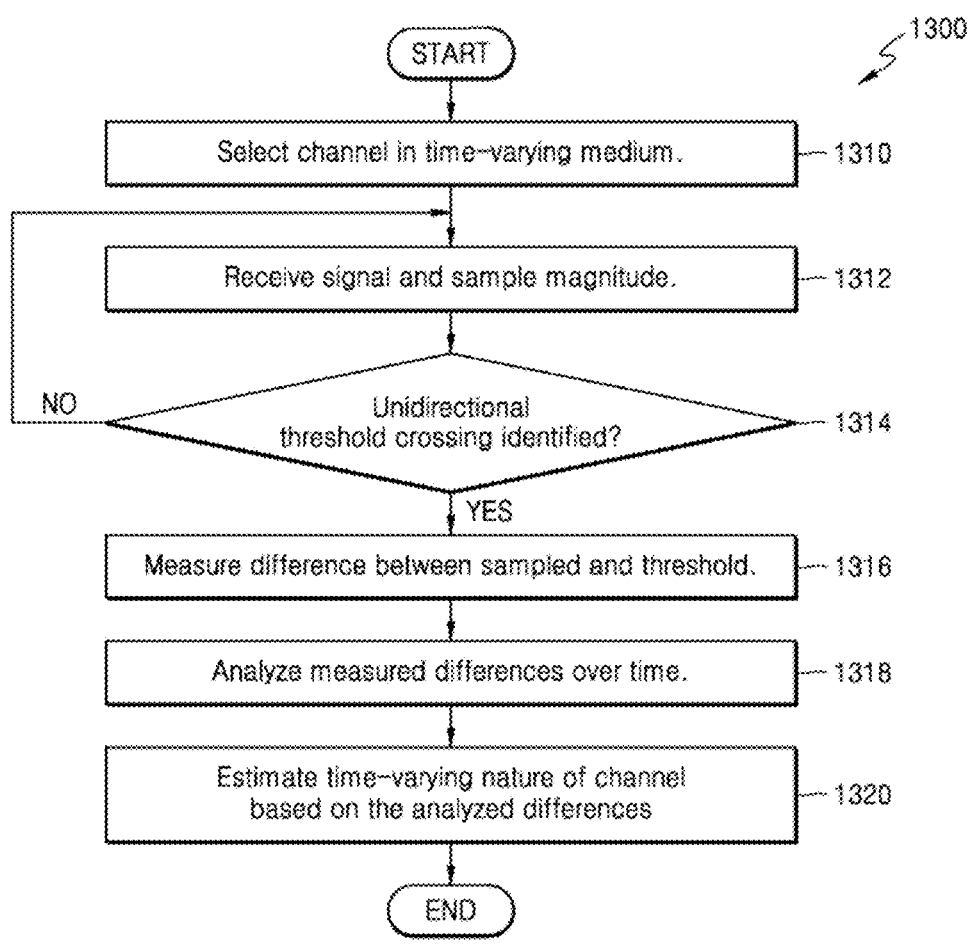

LOW-COMPLEXITY DOPPLER ESTIMATOR

TECHNICAL FIELD

Embodiments of the present inventive concept relate to wireless communications and sensing, and more particularly, to a low-complexity Doppler estimator usable for WiFi™.

DISCUSSION OF RELATED ART

Wireless communications generally require synchronization at a receiver for accurate decoding. WiFi™ is a family of wireless radio communications technologies based on the IEEE 802.11 family of standards.

The next generation of WiFi™ may be operated in much higher Doppler environments, as facilitated by the presence of the HE-SU-ER transmission format of the proposed IEEE 802.11ax standard. Movement of the transmitter and/or receiver, and/or movement of reflective objects around the transmitter and/or receiver, for example, may give rise to a time-varying channel with changes in multi-path rays resulting in time-varying fades as paths move through constructive and destructive superposition and interference as a function of time.

The proposed IEEE 802.11ax standard defines the presence of a mid-amble, which may include a repetition of the HE-LTF preamble within the packet, that may be placed either at once every 10 or at once every 20 orthogonal frequency-division multiplexing (OFDM) data symbols. The presence of mid-ambles within the OFDM data symbols is indicated by the Doppler bit, which is carried within the HE-SIG-A field in the preamble.

Mid-ambles allow the receiver to update or track the channel as it changes throughout the data packet due to the presence of Doppler or movement in the channel. This is unlike existing WiFi™ receivers such as 802.11a/g/b/n/ac, which assumed a quasi-static channel that was fixed at the start of the packet using the preamble.

In order to decide whether to request that mid-ambles be inserted into a transmission, the receiver needs to determine whether the current channel between the transmitter and receiver is a time-varying channel, and set the HE-SIG-A DOPPLER subfield to 1 to recommend to the transmitter that a mid-amble be used for the reverse link.

SUMMARY

An exemplary embodiment method is provided for Doppler estimation of a signal received over a time-varying transmission medium, including receiving the signal over a channel of the time-varying transmission medium; sampling a magnitude of the received signal repeatedly over time; identifying unidirectional threshold crossings of the sampled magnitude about a threshold magnitude relative to a mean magnitude; measuring differences between the sampled magnitude and the threshold magnitude for the identified crossings; analyzing the measured differences over time; estimating the time-varying nature of the channel based on the analyzed differences; and transmitting a signal indicative of the estimated time-varying nature.

The method may be applied where the signal comprises frequency-modulated data packets, and further include receiving a first plurality of data packets over a downlink channel of the time-varying transmission medium; analyzing the received first plurality of data packets for at least one of constructive or destructive superposition as a function of time; predicting a condition of the downlink channel for a subsequent transmission interval based on the analysis; estimating whether the time-varying nature of the downlink channel is likely to be one of low, high, or very high based on the prediction; constructing a mid-amble periodicity request based on the estimated nature; sending the constructed request over an uplink channel of the time-varying transmission medium; receiving a second plurality of data packets over the downlink channel wherein at least one of the second plurality comprises a mid-amble responsive to the sent request; and compensating at least the second plurality of data packets for Doppler shift based on the mid-amble.

The method may be applied to a mode where Doppler metrics, such as magnitude above a threshold and time-stamps, are measured by a client and directly used by the client to request a mid-amble mode from an access point (AP). The method may be applied to a mode where Doppler metrics, such as magnitude above a threshold and time-stamps, are measured by a client and sent back to an AP for the AP to directly select a mid-amble mode.

The method may be applied where analyzing includes sampling the channel by channel estimation processing inherent to a coherent modem receiver. The method may be applied where the channel is an orthogonal frequency-division multiplexing (OFDM) channel, analyzing comprising estimating each data-bearing subcarrier of the OFDM channel. The method may be applied where the channel is a WiFi™ channel, analyzing comprising sampling beacon frames that are transmitted at approximately regular intervals by an Access Point. The method may be applied where analyzing includes detecting a threshold value of the channel and detecting time instances where channels are closest to the threshold.

The method may be applied where analyzing includes detecting instances where the channel, or at least one of a plurality of channels having comparable characteristics, is coming out of a fade or crossing a threshold with a positive gradient. It shall be understood that the selection of positive gradients or negative gradients is optional. That is, if negative gradient crossings were chosen instead of positive gradient crossings, the embodiment would operate substantially the same with a corresponding change to the detection processing.

This method may further include collecting timestamps and distance magnitudes from the threshold for each detected instance. This method may yet further include relaying the collected timestamps and distance magnitudes to a transmitting device. This technical feature may be advantageous in embodiments that experience asymmetric traffic conditions, such as, for example, where there are too few packets in the uplink for an Access Pont (AP) to assess the Doppler conditions, such that the information may be relayed back from the peer station instead, and particularly where the peer may be receiving regular beacon frames from the AP, for example.

This method may be applied where the transmitting device uses the collected timestamps and distance magnitudes over time to determine the time-varying nature of the channel and decide on whether or how often to use mid-ambles in the transmissions. This method may be applied where the relaying is performed using dedicated management packets over the uplink channel.

An exemplary embodiment Doppler estimator is provided for data packets to be received over a time-varying transmission medium, including a receiver configured to receive a first plurality of data packets over a downlink channel of the time-varying transmission medium; a processor configured to analyze the received first plurality of data packets for at least one of constructive or destructive superposition as a function of time, predict a condition of the downlink channel for a subsequent transmission interval based on the analysis, and estimate whether the time-varying nature of the downlink channel is likely to be one of low, high, or very high based on the prediction; and a transmitter configured to construct a mid-amble periodicity request based on the estimated nature, and send the constructed request over an uplink channel of the time-varying transmission medium; wherein the receiver is further configured to receive a second plurality of data packets over the downlink channel, at least one of the second plurality comprising a mid-amble responsive to the sent request; wherein the processor is further configured to compensate at least the second plurality of data packets for Doppler shift based on the mid-amble; and wherein the processor is further configured to analyze by sampling the channel magnitude at substantially regular time intervals, setting a threshold magnitude relative to a mean magnitude, identifying positive-going threshold crossings, and measuring for the positive-going threshold crossings the magnitude difference between the sampled channel and the threshold.

The Doppler estimator may include the receiver having a coherent modem receiver configured to sample the downlink channel by channel estimation processing, the downlink channel is an orthogonal frequency-division multiplexing (OFDM) channel, and at least one of the receiver or the processor is configured to estimate the channel on each data-bearing subcarrier of the OFDM channel. The Doppler estimator may be used where the receiver is configured to take samples as a function of time as new packets are received, the downlink channel is a WiFi™ channel, and at least one of the receiver or the processor is configured to sample beacon frames that are transmitted at approximately regular intervals by an Access Point, detect a threshold value of the downlink channel, and detect time instances where channels are closest to the threshold.

The Doppler estimator may include that at least one of the receiver or the processor is configured to detect instances where the downlink channel, or at least one of a plurality of channels having comparable characteristics, is coming out of a fade and crossing a threshold with a positive gradient. This Doppler estimator may include at least one of the receiver or the processor being configured to collect time stamps and distance magnitudes from the threshold for each instance. This Doppler estimator may further include the transmitter being configured to relay the collected time stamps and distance magnitudes to an access point. The Doppler estimator may be applied where the access point is configured to determine the time-varying nature of the channel based on time stamps and distance magnitudes collected from its clients to fine-tune the periodicity of mid-ambles in its transmissions. The Doppler estimator may be applied where the transmitter is configured to relay using dedicated management packets over the uplink channel.

An exemplary program storage device is provided, tangibly embodying a non-transitory program of instructions executable by a processor to implement Doppler estimation for a signal to be received over a time-varying transmission medium, the program instructions comprising: receiving the signal over a channel of the time-varying transmission medium; sampling a magnitude of the received signal repeatedly over time; identifying unidirectional threshold crossings of the sampled magnitude about a threshold magnitude relative to a mean magnitude; measuring differences between the sampled magnitude and the threshold magnitude for the identified crossings; analyzing the measured differences over time; estimating the time-varying nature of the channel based on the analysis analyzed differences; and transmitting a signal indicative of the estimated time-varying nature.

An exemplary system is provided including an apparatus and method of Doppler estimation, for data packets to be received over a time-varying transmission medium, including receiving a first plurality of data packets over a downlink channel of the time-varying transmission medium; analyzing the received first plurality of data packets for at least one of constructive or destructive superposition as a function of time; predicting a condition of the downlink channel for a subsequent transmission interval based on the analysis; estimating whether the time-varying nature of the downlink channel is likely to be one of low, high, or very high based on the prediction; constructing a mid-amble periodicity request based on the estimated nature; sending the constructed request over an uplink channel of the time-varying transmission medium; receiving a second plurality of data packets over the downlink channel, wherein at least one of the second plurality comprises a mid-amble responsive to the sent request; and compensating at least the second plurality of data packets for Doppler shift based on the mid-amble, where analyzing includes sampling the channel magnitude at substantially regular time intervals, setting a threshold magnitude relative to a mean magnitude, identifying positive-going threshold crossings, and measuring for the positive-going threshold crossings the magnitude difference between the sampled channel and the threshold.

BRIEF DESCRIPTION OF THE DRAWINGS

Aspects of the present inventive concept may become more apparent and be better appreciated upon consideration of the following description of exemplary embodiments when taken in conjunction with the accompanying drawings, in which:

FIG. 13 is a schematic flow diagram of a method for low-complexity Doppler estimation in accordance with an exemplary embodiment of the present inventive concept.

DETAILED DESCRIPTION

Figure 1:
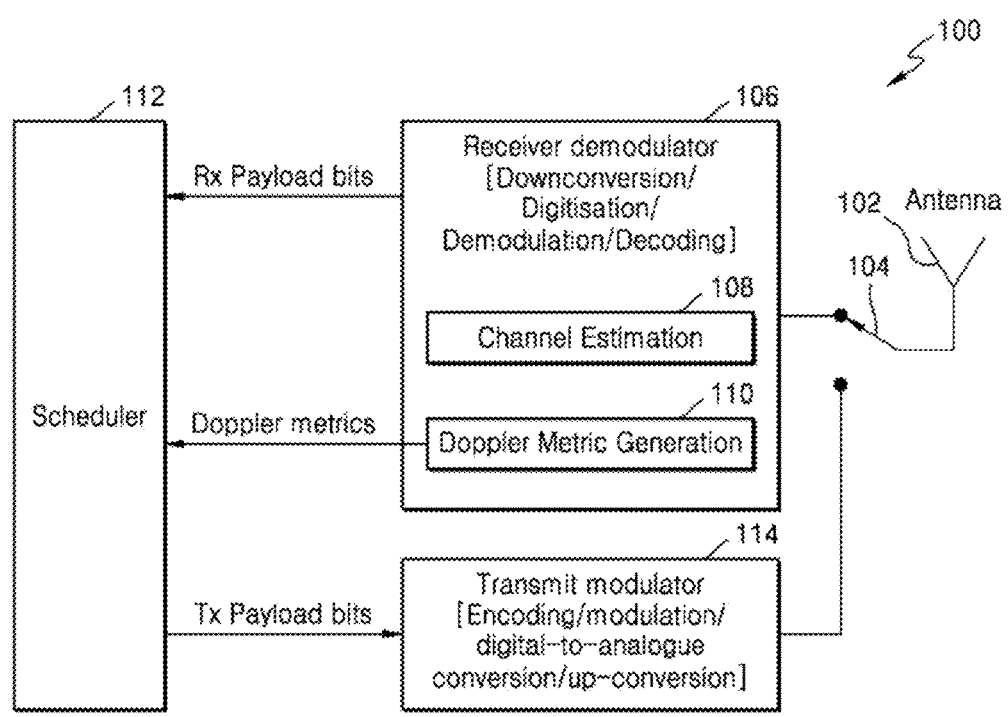
FIG. 1 is a schematic block diagram of a client or peer transceiver configured for low-complexity Doppler estimation in accordance with an exemplary embodiment of the present inventive concept.

The present inventive concept provides a method and apparatus to estimate the extent of time variance in a wireless channel, such as in a WiFi™ communications or sensing channel. Exemplary embodiments may determine whether the current channel is time-varying by categorizing the present channel condition, for example, as one of low, highly, or very-highly time varying. Embodiments have applicability to wireless communications and wireless sensing, such as in the use of radio signals to sense changes to an environment where the signals propagate.

The proposed IEEE 802.11ax standard allows an optional mid-amble sequence to be placed at either every 10 data symbols or every 20 data symbols. According to at least one embodiment, if the channel is determined to be a "very highly" time-varying channel, then mid-amble sequences are placed at a periodicity of one per every 10 data symbols. Otherwise, if it is determined to be merely a "highly" time-varying channel, then mid-amble periodicity can be set at one per every 20 data symbols. Whereas if it is currently indicated as a "low" time-varying channel, then no mid-amble sequence would be inserted into the data symbols.

Although the uplink and downlink channels themselves need not be symmetric, much less inherently asymmetric, even symmetric uplink and downlink channels may experience asymmetric or unbalanced traffic. Asymmetry in terms of unbalanced traffic, where, for example, the uplink traffic may not be frequent enough for a Doppler estimator to operate effectively since it would have insufficient and/or too infrequent data, may be addressed by exemplary embodiments providing Doppler feedback such as peer estimates. In such embodiments, the peer may estimate the Doppler based on the periodic beacon frames transmitted by the Access Point (AP), for example, and feed this measurement information and/or a categorization or time-variance rating or mid-amble request based on it, back to the AP.

For WiFi™ applications, a physical layer convergence procedure (PLCP) prepares the frame for transmission by taking the frame from the media access control (MAC) sublayer and creating a PLCP Protocol Data Unit (PPDU). There are no explicit features in the transmitted WiFi™ PPDU to enable channel-specific Doppler estimation. Therefore, the present inventive concept provides a robust method to determine the time-varying nature of the prevailing channel conditions, such as by using the existing WiFi™ PPDU. It shall be understood that for the proposed 802.11ax standard, it is not actually necessary to determine the detailed nature of the prevailing Doppler spectrum. That is, a proposed 802.11ax receiver need only decide on the prevailing channel in terms of "very highly", "highly" or "low" time-varying conditions.

In asymmetric traffic conditions, the transmitter will generally not have an opportunity to measure the Doppler frequency of the link to its peer. Hence, it may also be desirable to measure the level of Doppler frequency shift at the receiving station and report it back to the transmitter.

Doppler estimation has been studied previously. An embodiment of the present inventive concept need not use an autocorrelation function in its Doppler estimator. Instead, a low-complexity level-crossing rate (LCR) approach may be used to measure the rate at which the channel magnitude crosses the mean level of the channel magnitude as the channel goes in and out of fading conditions. In turn, this metric may then be related to the Doppler frequency.

In operation, radio channel magnitudes are sampled at substantially regular time intervals. In WiFi™, for example, this may be expediently achieved by using channel estimates based on received beacon packets. A threshold level may be set relative to the mean level to ensure that the channel is likely to be going into or coming out of a deep fade at the point of threshold crossing, and then selecting only the positive going threshold crossings or instances where the channel is coming out of a fade.

Given these conditions, at least one embodiment makes a further measurement: For the positive-going threshold crossings, the magnitude difference between the sampled channel and the threshold is also measured. The rationale behind this measurement is that, for high Doppler channels, it is more likely that the magnitude difference will be large since the channel will be more likely to have been sampled whilst in a deep fade with higher probability than for a channel with a low Doppler. Thus, by examining the statistics of the time between positive-going threshold crossings of sampled channels and the magnitude difference between the channel samples and a threshold, a decision on the Doppler state of the channel may be made.

Thus, an exemplary embodiment of the present inventive concept may include: measuring a distance metric from a threshold level for a positive going channel's magnitude, time-stamping and computing magnitude differences from threshold collection, relaying information back to a transmitter (e.g., a WiFi™ access point) using a dedicated frame type (e.g., a network management frame), and statistical detection of the Doppler level. Preferred embodiments feature low complexity, both in terms of processing and implementation. Technical advantages may include faster estimation of Doppler and/or reduced processing load, power consumption or heat sink requirements.

As shown in FIG. 1, an exemplary embodiment client transceiver is indicated generally by the reference numeral 100. The client transceiver 100 includes an antenna 102 connected to a switch 104. A first or receive pole of the switch 104 is connected, in turn, to a receiver demodulator 106, which is configured to perform down-conversion, digitization or analog-to-digital conversion (ADC), demodulation, and/or decoding. Here, the receiver demodulator 106 includes a channel estimator 108 and a Doppler metric generator 110. The receiver demodulator 106 and the Doppler metric generator 110 thereof are connected to a scheduler 112, which, in turn, is connected to a transmit modulator 114. The receiver demodulator 106 is configured to provide a signal indicative of Doppler metrics to the scheduler 112, which, in turn, is configured to receive and process received (Rx) payload bits from the receiver demodulator 106 and the Doppler metrics from the Doppler metric generator 110, and to provide transmit (Tx) payload bits including a signal responsive to, based on, and/or including the Doppler metrics to the transmit modulator 114. The transmit modulator 114 is configured to perform encoding, modulation, digital-to-analog conversion (DAC), and/or up-conversion, and is connected to a second or transmit pole of the switch 104 and hence to the antenna 102.

Figure 2:
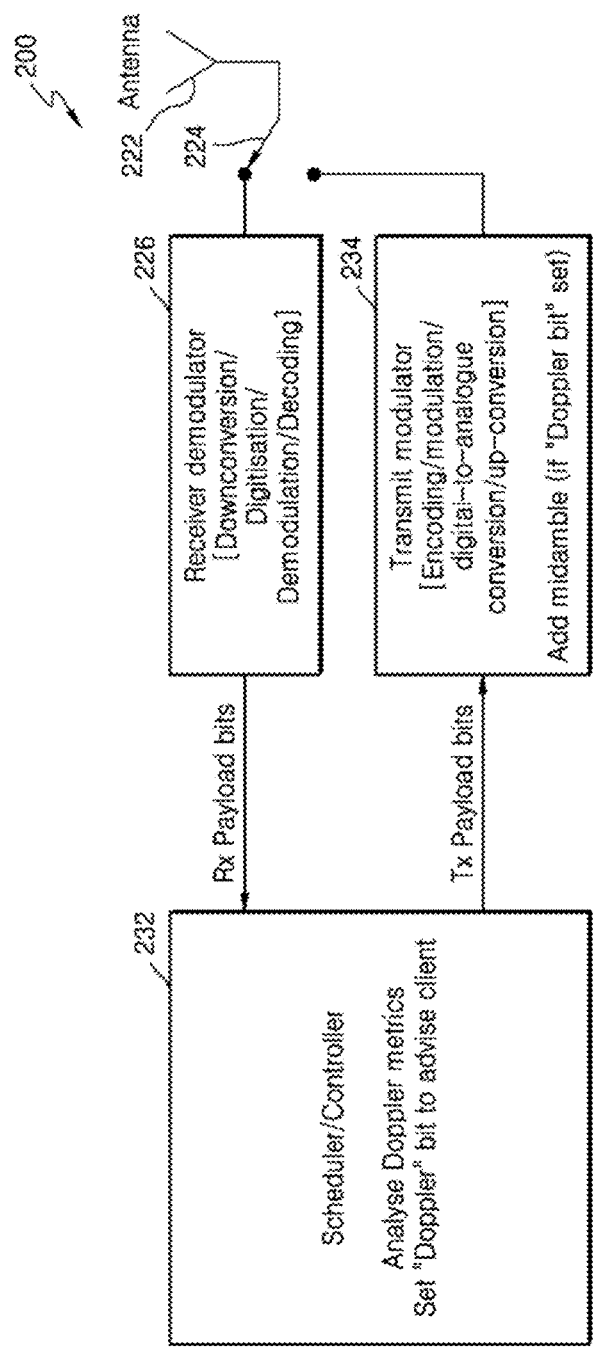
FIG. 2 is a schematic block diagram of an access point (AP) transceiver configured for low-complexity Doppler estimation in accordance with an exemplary embodiment of the present inventive concept.

Turning to FIG. 2, an exemplary embodiment access point (AP) transceiver is indicated generally by the reference numeral 200. The AP transceiver 200 includes an antenna 222 connected to a switch 224. A first or receive pole of the switch 224 is connected, in turn, to a receiver demodulator 226, which is configured to perform down-conversion, digitization or ADC, demodulation, and/or decoding. The receiver demodulator 226 is connected to a scheduler controller 232, which, in turn, is connected to a transmit modulator 234. The receiver demodulator 226 is configured to provide a signal indicative of received (Rx) payload bits, including but not limited to a signal responsive to, based on, and/or including the Doppler metrics, to the scheduler controller 232, The scheduler controller 232, in turn, is configured to analyze the AP's Rx payload bits signal responsive to, based on, and/or including the Doppler metrics from the receiver demodulator 226, set a Doppler bit to advise its clients, and to provide transmit (Tx) payload bits to the transmit modulator 234. The transmit modulator 234 is configured to perform encoding, modulation, digital-to-analog conversion, and/or up-conversion; and to add a mid-amble if the Doppler bit is set. The transmit modulator 234 is connected, in turn, to a second or transmit pole of the switch 224 and hence to the antenna 222.

In operation, an exemplary embodiment Doppler estimator may be implemented by a Doppler metric generator and/or scheduler of a client or peer transceiver, and/or by a scheduler controller of an AP transceiver, for example. Such a client transceiver might further include, for example, the digitizer or ADC of the receiver demodulator being connected to a cyclic prefix remover or other pre-processor, which, in turn, may be connected to a fast Fourier transformer (FFT). The FFT may be connected to a pilot extractor, which, in turn, may be connected to the channel estimator, which is connected to the Doppler metric generator. Thus, the Doppler estimator may be implemented after symbol-level processing such as the cyclic prefix remover through the channel estimator, but prior to any bit-level processing, for example. Such an AP transceiver might further include, for example, a pilot insertor connected to an inverse fast Fourier transformer (iFFT), which may be connected to a cyclic prefix insertor. The cyclic prefix insertor may be connected to the DAC of the transmit modulator. Thus, while exemplary embodiments include Doppler metric generation at the client or peer, they may include processing or analysis of the Doppler metrics at the client or peer, at the AP, or shared among them. Moreover, in load-sensitive and/or resource-intensive applications, analysis of the Doppler metrics may be offloaded from client to AP, client to clients, peer to peer, or AP to client or clients, based on temporary load factors such as throughput, temperature, battery level or the like at any given device.

The present exemplary embodiment transceivers may use a direct conversion receiver architecture capable of implementing the inventive concept, although the inventive concept is not limited to this type of architecture. For example, a super-heterodyne type of receiver or the like may be used in alternate embodiments. The signal may be received in the 2.4 GHz band, for example, which may then be amplified, mixed, and sampled. The signal may then be digitized and optionally low-pass filtered using a filter having sufficiently wide bandwidth to allow passage of the signal including any frequency offset prior to any down-sampling. Thus, the inventive concept works on buffered data, optionally down-sampled in alternate embodiments.

It shall be understood that exemplary embodiments of the inventive concept may perform some or all of their tasks in one or more modules or submodules, where the Doppler estimation itself may reside entirely on the client, or be shared between the client and the access point. For example, a Doppler mode requestor may be optionally defined as that part of a client's or peer's Doppler estimator that builds an 802.11ax Doppler mode request to be sent to an Access Point (AP), but this may alternatively be implemented by any suitable module. In another embodiment, the client measures Doppler information and forwards this to the access point so the Doppler estimation may be performed at the access point.

In exemplary embodiments, a client's Doppler estimator may perform any one or more of the following without limitation: 1) collecting and/or measuring the current Doppler-relevant information (including pre-amble and mid-amble when available), 2) estimating the current Doppler based on the information, 3) predicting potential near-term Doppler (such as when a client is travelling in a lift or elevator where the Doppler is changing but substantially repeats between floors, riding on a merry-go-round, or experiencing comparable repetitive fades due to a myriad of other conditions; or, alternatively, has apparently stopped moving, for example) based on the current information and optionally based on prior information, and/or 4) reporting either a) the relevant raw Doppler-related information and/or b) the Doppler estimation and/or c) a Doppler prediction and/or d) a Doppler bit request, to at least one AP.

Figure 3:
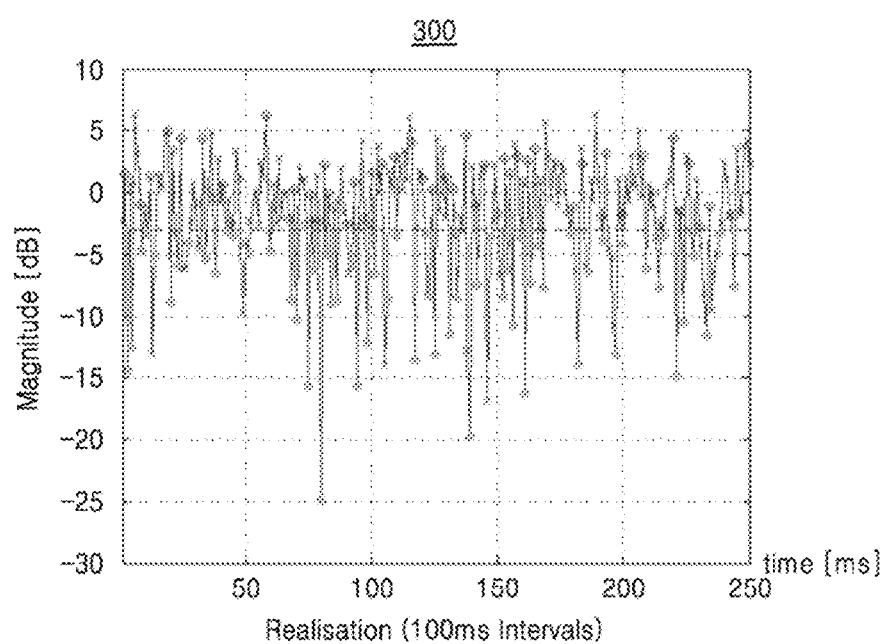
FIG. 3 is a graphical diagram of channel magnitude estimated for a single subcarrier with a velocity of 1.2 km/h in accordance with an exemplary embodiment of the present inventive concept.
Figure 4:
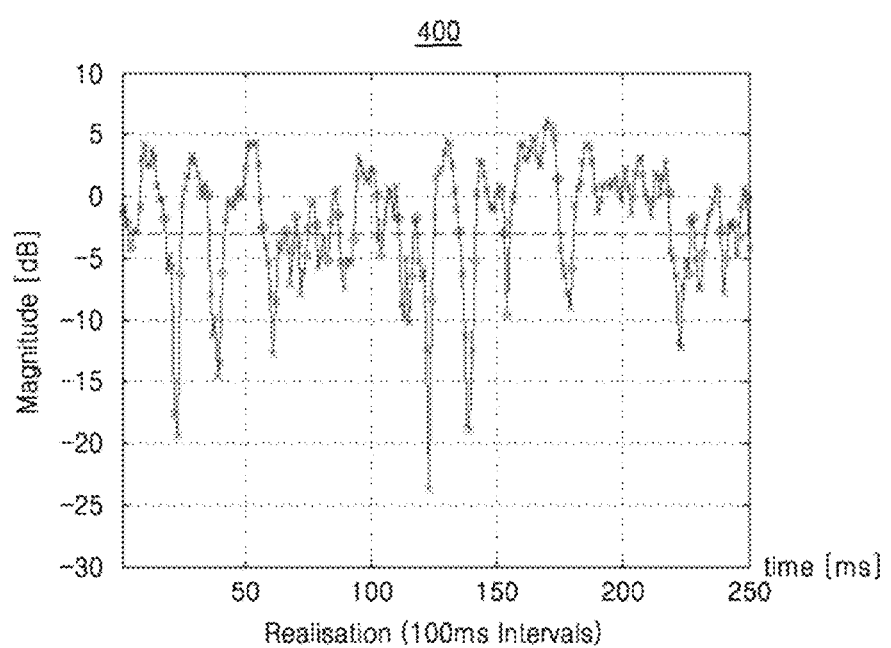
FIG. 4 is a graphical diagram of channel magnitude estimated for a single subcarrier with a velocity of 0.12 km/h in accordance with an exemplary embodiment of the present inventive concept.
Figure 5:
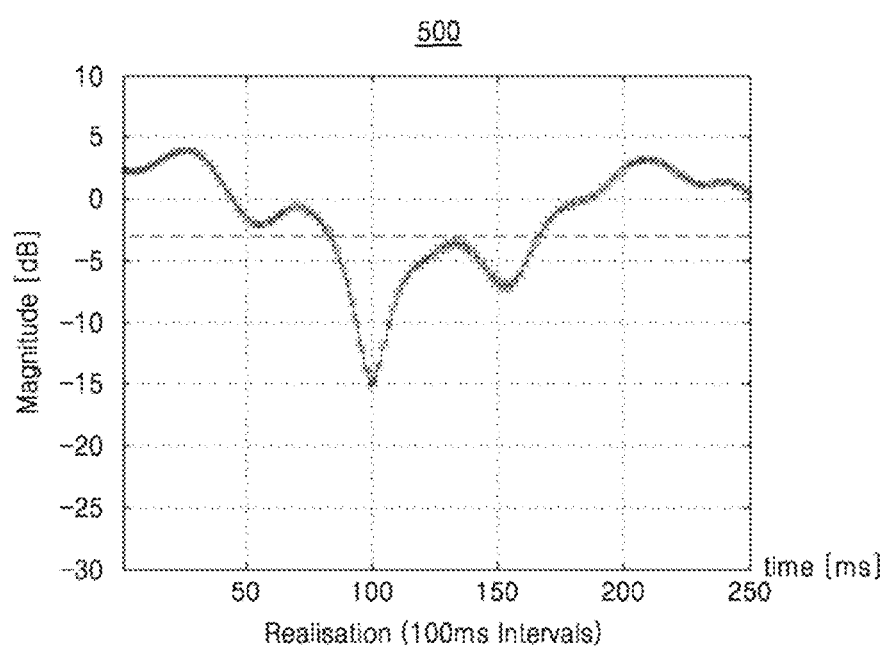
FIG. 5 is a graphical diagram of channel magnitude estimated for a single subcarrier with a velocity of 0.012 km/h in accordance with an exemplary embodiment of the present inventive concept.

FIGS. 3 through 5 illustrate exemplary embodiment signal processing for various channel velocities. That said, the present inventive concept is not limited to any particular channel velocity. It shall be understood that the Doppler spread and/or rate of change (e.g., acceleration) may be more important than particular offset (e.g., velocity) as far as applicability to higher velocities, for example. Thus, the exemplary embodiment signal processing of FIGS. 3 through 5 is primarily for illustrative purposes.

Turning now to FIG. 3, an exemplary embodiment's signal processing is indicated generally by the reference numeral 300. Whereas conventional Doppler estimators may have based estimates upon time-domain autocorrelation characteristics, such approaches were relatively high in complexity and difficult to implement in WiFi™. In WiFi™, for example, there may be constraints on rate and periodicity at which the channel can be sampled, as well as on the phase coherency between channel estimates.

Thus, the present exemplary embodiment realizes that for regular, but not limited to periodic, channel sampling, a highly time-varying channel can be identified by the fact that there is a high probability that many of the channel samples will experience channel fades, which is an indicator of a time-varying channel, whereas for low time-varying channels this is not the case. Since the only metric may be the channel magnitude, phase coherency between channel samples is not required.

To illustrate this, FIG. 3 shows the magnitude of the channel response on a single subcarrier of the preamble LTF of a sequence of 802.11 WiFi™ transmissions as a function of time. The channel is generated using an IEEE multi-input multi-output (MIMO) Channel model, which models the scattering environment as moving with a velocity of 1.2 km/h corresponding to a Doppler frequency of 5.8 Hz. For existing WiFi™, this might be deemed a high Doppler channel although this represents about a slow walking velocity. The channel is sampled at a periodicity of 100 ms. This aligns with an average Beacon transmission periodicity and represents a realistic rate at which the channel could be reliably sampled in a typical WiFi™ network. In alternate embodiments, it shall be understood the beacon transmission periodicity and/or other sampling mechanism may be fully adjustable.

Referring to FIG. 3, the vertical axis represents magnitude in dB, and the horizontal axis represents realization, here at 100 ms intervals. Each cross mark represents the channel magnitude of a single subcarrier taken from the active set of subcarriers of the WiFi™ L-LTF preamble sequence used for channel estimation. A dashed line is drawn at a threshold level of −3 dB with respect to the mean RMS level of the channel, which is 0 dB for the purposes of this example. Thus, the channel magnitude may be estimated for a single subcarrier at a velocity of 1.2 km/h.

The circular markers identify the sampled channel magnitudes for which the next channel magnitude sample lies on the other side of the threshold. From among the identified channel magnitudes which satisfy this condition, a subset is further identified by solid circular makers, for which the trajectory over the threshold corresponds to a positive gradient. It is evident from FIG. 3 that there are many sampled channel magnitudes which lie in deep fades, up to −25 dB with respect to the root mean square (RMS) value.

As shown in FIG. 4, an exemplary embodiment's signal processing is indicated generally by the reference numeral 400. Here, channel magnitude is estimated for a single subcarrier at a velocity of 0.12 km/h. FIG. 4 is comparable to FIG. 3, so duplicate description may be omitted. FIG. 4 shows the result of similar processing to FIG. 3, but for a channel velocity of 0.12 km/h.

Turning now to FIG. 5, an exemplary embodiment's signal processing is indicated generally by the reference numeral 500. Here, channel magnitude is estimated for a single subcarrier with a velocity of 0.012 km/h. FIG. 5 is comparable to FIGS. 3 and 4, so duplicate description may be omitted. FIG. 5 shows the result of similar processing to FIGS. 3 and 4, but for a channel velocity of 0.012 km/h.

Since, in each of the cases illustrated in FIGS. 3, 4, and 5, the sampling rate of the channel is unchanged at the Beacon rate of once every 100 ms, but the rate of change of the channel slows, the channel magnitude samples which are identified as being on a positive threshold crossing slope are much closer to the threshold. This effect is clearly visible from a comparison of FIGS. 3, 4, and 5.

Figure 6:
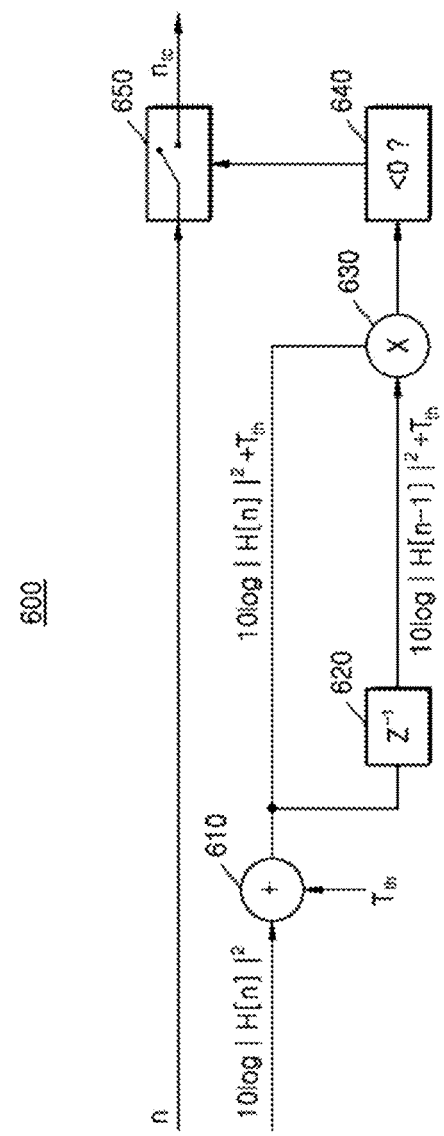
FIG. 6 is a schematic block diagram for selection of the threshold-crossing samples in accordance with an exemplary embodiment of the present inventive concept.

Turning now to FIG. 6, an exemplary embodiment implementation for identifying or selecting the threshold-crossing channel magnitude samples is indicated generally by the reference numeral 600. The inputs are the channel magnitudes in dB and the channel time index. This processing may be repeated for each subcarrier.

Here, the channel magnitudes are received at a block 610, and the threshold ($T_{th}$) is applied. The resulting signal is delayed at a block 620, and the delayed signal is convolved with the signal output from the block 610 at a block 630. A decision block 640 determines whether the result is less than zero. If the result is less than zero, the decision block 640 triggers a sampling block 650 to extract a threshold-crossing sample index ($n_{tc}$).

Thus, the channel magnitudes are shifted by the threshold ($T_{th}$) and the current sample multiplied by the previous sample. A negative product indicates that the threshold was crossed between the samples and therefore the threshold-crossing sample index $n_{tc}$ is extracted.

Figure 7:
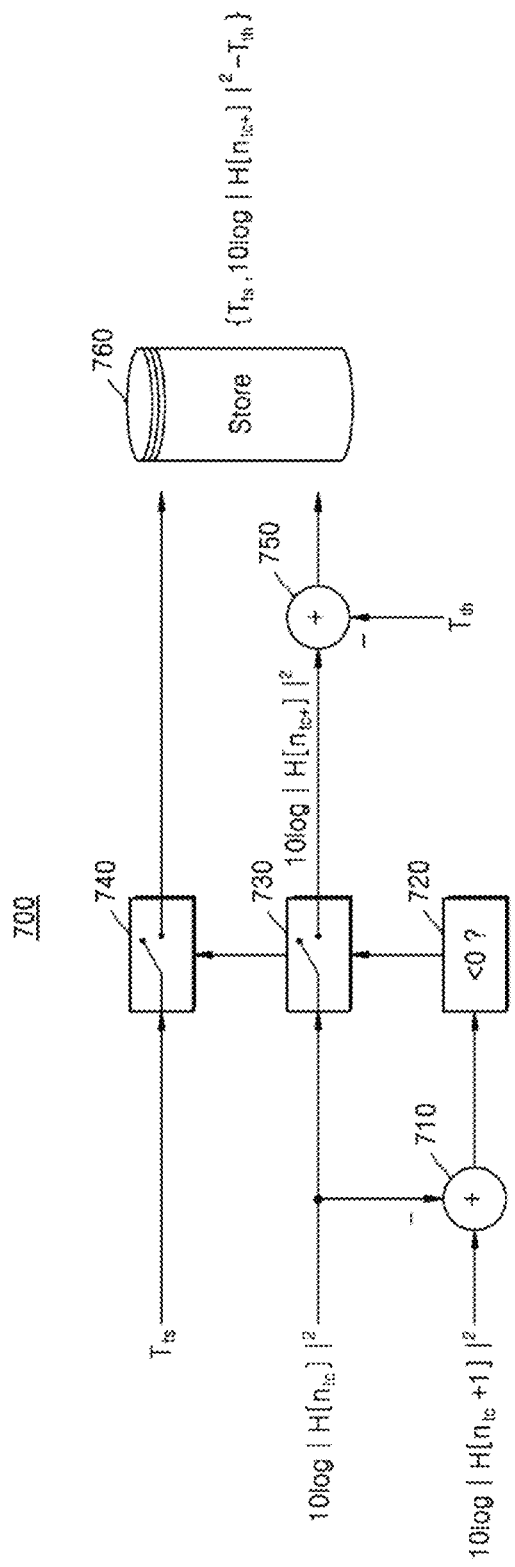
FIG. 7 is a schematic block diagram for measurement of the positive-going threshold crossing sample distances and storage with timestamp in accordance with an exemplary embodiment of the present inventive concept.

As shown in FIG. 7, an exemplary embodiment's implementation for selecting the positive-going threshold-crossing magnitude sample distances is indicated generally by the reference numeral 700. Referring to FIG. 7, a previous channel magnitude is subtracted from a present channel magnitude at a block 710, and a decision block 720 determines whether the result from the block 710 is less than zero. If the result is less than zero, sampling blocks 730 and 740 are triggered. Sampling block 730 obtains the magnitude sample after the next threshold crossing, and passes the signal to a block 750. The block 750 subtracts the threshold magnitude, and stores the result in a store 760. The sampling block 740 obtains the timestamp ($T_{ts}$) at the same time as the magnitude sample, and stores the result in the store 760.

Thus, a threshold-crossing sample is compared with the next sample in the sequence, and a positive difference indicates a positive-going threshold cross. For those samples, the threshold is removed and the results stored, along with the timestamp of the time at which the channel samples were obtained ($T_{ts}$).

FIGS. 8 through 12 are presented to illustrate exemplary embodiments for identification of Doppler, and indicate statistics of the exemplary positive-crossing points, where it shall be understood that negative-crossing points may optionally be used instead, and distance from threshold obtained from simulation of reception of a period beacon transmission every 100 ms.

Figure 8:
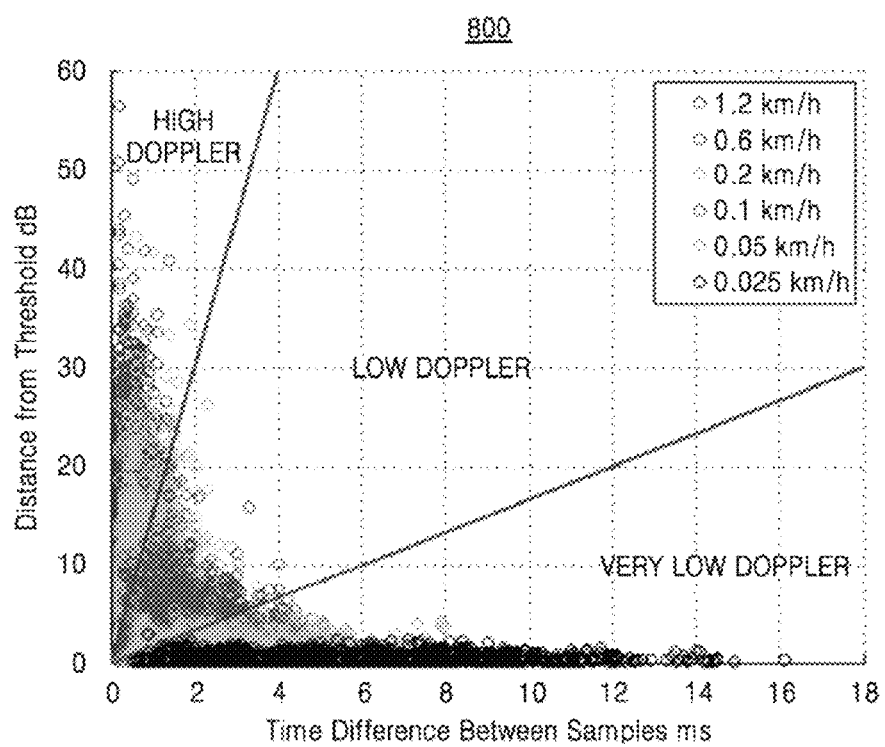
FIG. 8 is a graphical diagram scatter plot of distance from threshold versus time difference between positive-going threshold crossing samples for a range of channel velocities in accordance with an exemplary embodiment of the present inventive concept.

Turning to FIG. 8, a Scatter plot of distance from threshold versus time difference between positive-going threshold crossing samples for a range of channel velocities is indicated generally by the reference numeral 800. The scatter plot of the distance from threshold versus time difference between positive-going threshold crossing samples is shown for a range of channel velocities, namely 1.2 km/h, 0.6 km/h, 0.2 km/h, 0.1 km/h, 0.05 km/h and 0.025 km/h. It shall be understood that the names of the categories, such as very-high, high, medium, low, and very-low Doppler may be arbitrary; except where configured for operation under the proposed 802.11ax WiFi™ standard.

From the scatter plot of FIG. 8, it is clear that difference channel velocities can be discerned by examination of the time difference and distance from the threshold metric. Regions of "Very Low Doppler", "Low Doppler" and "High Doppler" are shown. By collecting metrics of distance and time between distance metrics, and binning into the appropriate regions, a simple method to estimate the Doppler of the channel is enabled.

Figure 9:
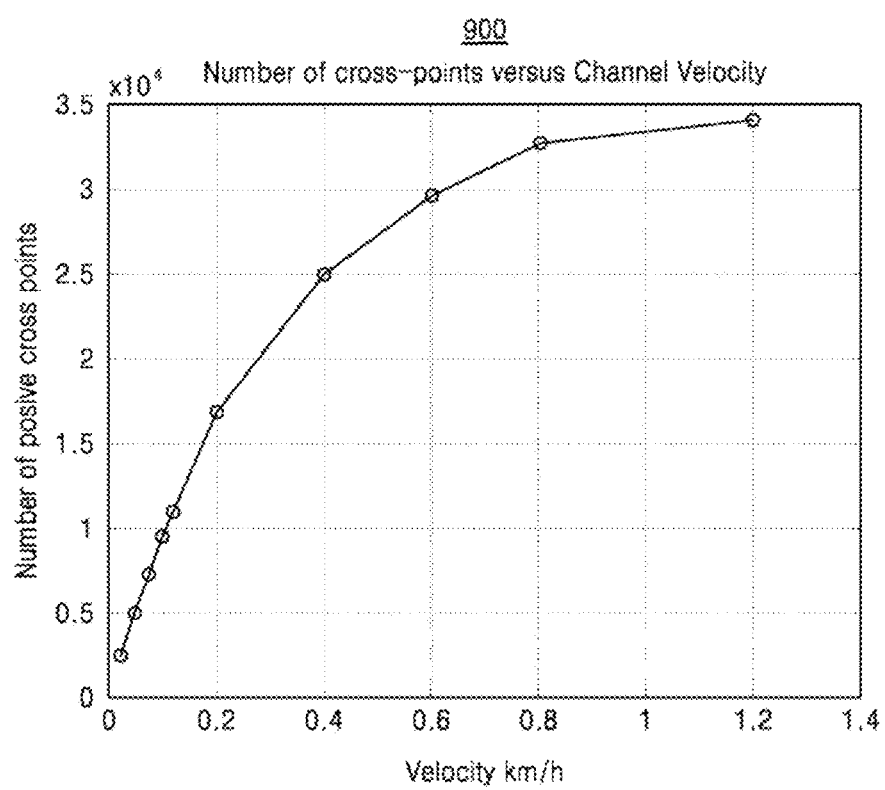
FIG. 9 is a graphical diagram for mean number of positive cross-points versus channel velocity in the simulation time in accordance with an exemplary embodiment of the present inventive concept.

Turning now to FIG. 9, the Mean number of Positive Cross-points versus Channel Velocity in the Simulation Time is indicated generally by the reference numeral 900. This information follows from that of FIG. 8, so duplicate description may be omitted.

Figure 10:
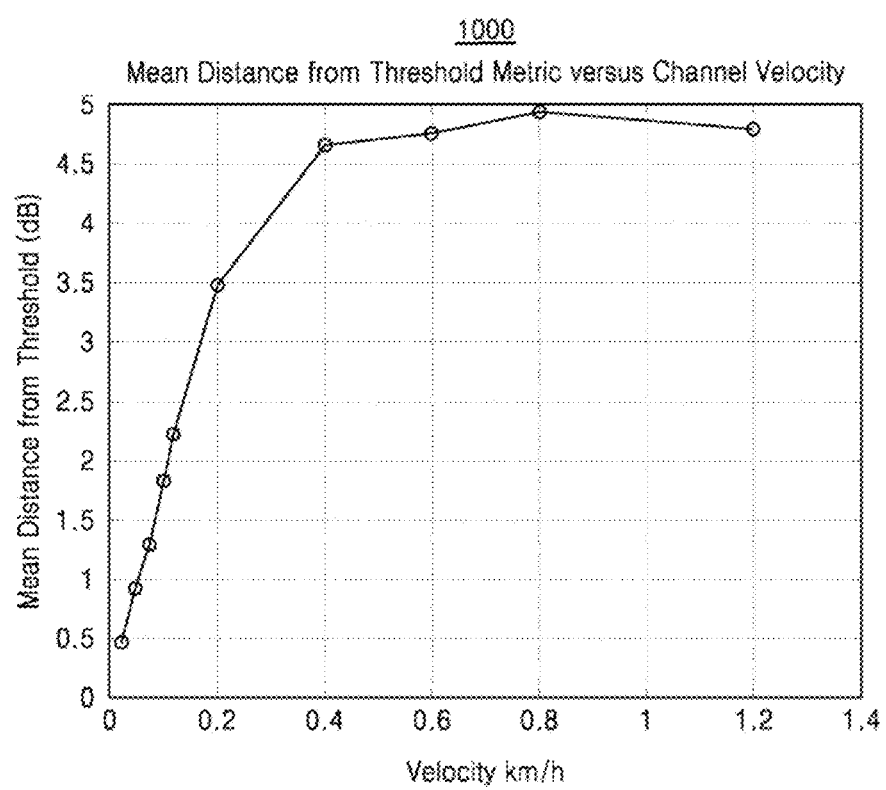
FIG. 10 is a graphical diagram of mean distance from threshold versus channel velocity in the simulation time in accordance with an exemplary embodiment of the present inventive concept.

As shown in FIG. 10, the Mean Distance from Threshold versus Channel Velocity in the Simulation Time is indicated generally by the reference numeral 1000. This information follows from that of FIGS. 8 and 9, so duplicate description may be omitted.

Figure 11:
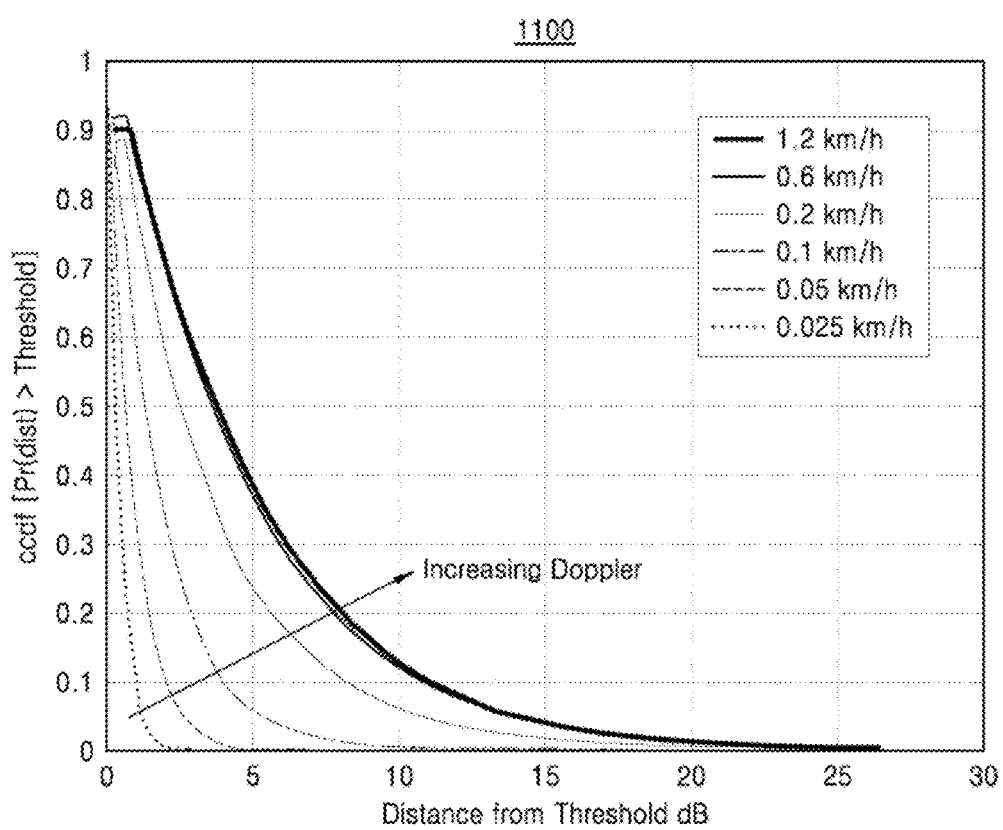
FIG. 11 is a graphical diagram of complementary cumulative distribution function (CCDF) plots of the difference between the threshold T=−3 dB for positive going threshold-crossing values in accordance with an exemplary embodiment of the present inventive concept.
Figure 12:
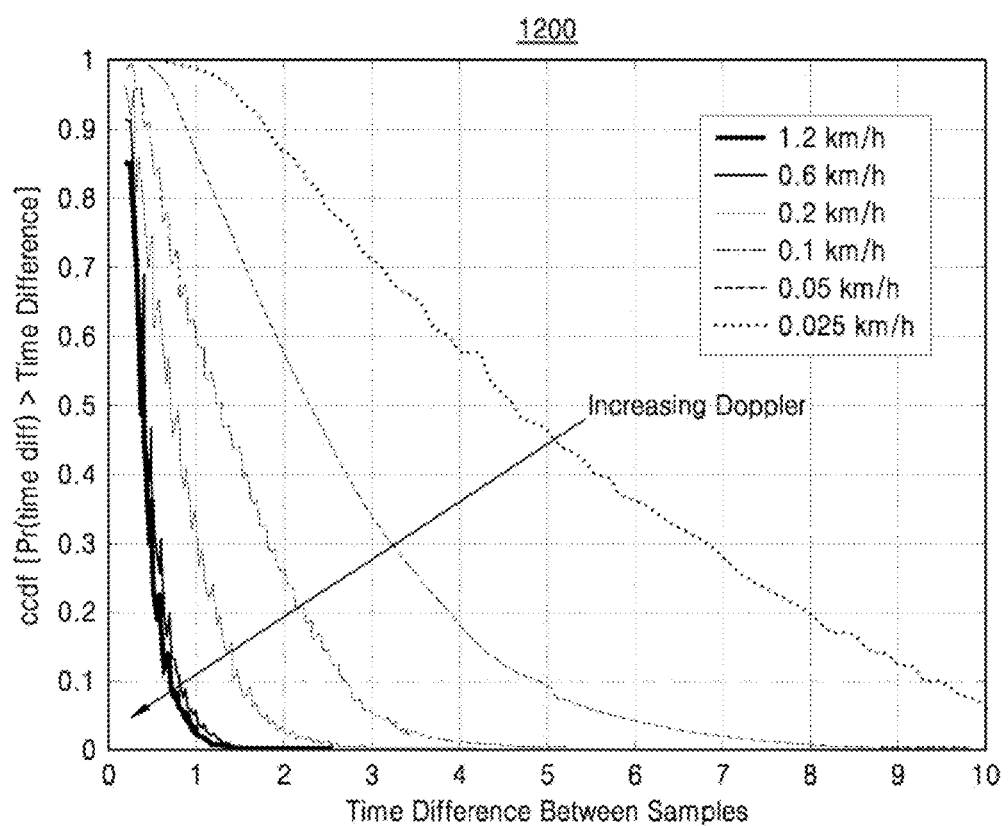
FIG. 12 is a graphical diagram of CCDF plots of the time between positive-going threshold crossing samples for a range of channel velocities and a threshold T=−3 dB in accordance with an exemplary embodiment of the present inventive concept.

In FIGS. 11 and 12, the above is further illustrated with reference to complementary cumulative distribution function (CCDF) plots for positive going threshold-crossings, so duplicate description may be omitted. These show CCDF distributions of the threshold distance and time between positive-going threshold crossing samples for a range of channel velocities Turning to FIG. 11, a CCDF distribution of the difference between the threshold T=−3 dB for positive going threshold-crossing values is indicated generally by the reference numeral 1100. Duplicate description is omitted.

Turning now to FIG. 12, a CCDF distribution of the time between positive-going threshold crossing samples for a range of channel velocities and a threshold T=−3 dB is indicated generally by the reference numeral 1200. Duplicate description is omitted.

As shown in FIG. 13, an exemplary embodiment method of operating a Doppler metric generator for Doppler estimation through a time-varying medium is indicated generally by the reference numeral 1300. Here, a start block passes control to a function block 1310. The function block 1310 selects an estimated channel in the time-varying medium, and passes control to a function block 1312. The function block 1312, in turn, receives the signal and samples its magnitude before passing control to a decision block 1314. The decision block 1314 identifies whether a unidirectional (e.g., rising) threshold crossing has occurred, and passes control to a function block 1316, which measures the difference between the sampled and threshold magnitudes and passes control to a function block 1318. The function block 1318 analyzes the measured differences over time, and passes control to a function block 1320. The function block 1320, in turn, estimates the time-varying nature of the estimated channel based on the analysis.

Embodiments directed towards WiFi™, Bluetooth®, or the like, may include additional steps for receiving and processing in-phase (I) and quadrature (Q) valued data, down-sampling such data, buffering many samples of such data, performing a FFT on such samples into multiple bins, calculating a square of the absolute values or other averaging means for the bins, summing sets of bins over multiple combinations to cover frequency errors, taking a maximal combination prior to comparison with a threshold, looping control back to an earlier point or performing optional steps depending on whether the threshold is crossed and in what direction, using FFT bin phases to extract symbol timing, and/or the like.

While exemplary embodiments have been described to operate in WiFi™ environments, and a preferred embodiment has been described to operate under the proposed 802.11ax WiFi™ standard, the present inventive concept is not limited thereto. For example, alternate embodiments of the present inventive concept may be configured to operate over Bluetooth®, Bluetooth® Long-Range, and/or other wireless communications channels or sensing environments.

Although exemplary embodiments of the present inventive concept have been shown and described, it shall be understood that those of ordinary skill in the pertinent art may make changes therein without departing from the scope, principles, and spirit of the present inventive concept as defined by the appended claims and their equivalents.

What is claimed is:

1. A method of Doppler estimation for a signal received over a time-varying transmission medium, comprising:
    receiving the signal over a channel of the time-varying transmission medium;
    sampling a magnitude of the received signal repeatedly over time;
    identifying unidirectional threshold crossings based on the sampled magnitude;
    measuring differences between the sampled magnitude and a threshold magnitude for the identified crossings;
    analyzing the measured differences over time;
    estimating the time-varying nature of the channel based on the analyzed differences; and
    transmitting a signal indicative of the estimated time-varying nature.

2. The method of claim 1 wherein the signal comprises frequency-modulated data packets, the method further comprising:
    receiving a first plurality of data packets over a downlink channel of the time-varying transmission medium;
    analyzing the received first plurality of data packets for at least one of constructive or destructive superposition as a function of time;
    predicting a condition of the downlink channel for a subsequent transmission interval based on the analysis;
    estimating whether the time-varying nature of the downlink channel is likely to be one of low, high, or very high based on the prediction;
    constructing a mid-amble periodicity request based on the estimated nature;
    transmitting the constructed request over an uplink channel of the time-varying transmission medium;
    receiving a second plurality of data packets over the downlink channel wherein at least one of the second plurality comprises a mid-amble responsive to the transmitted request; and
    compensating at least the second plurality of data packets for Doppler shift based on the mid-amble.

3. The method of claim 1, wherein the analyzing of the measured differences further comprises sampling the channel by channel estimation processing inherent to a coherent modem receiver.

4. The method of claim 1, wherein the channel is an orthogonal frequency-division multiplexing (OFDM) channel, and
    wherein the analyzing of the measured differences further comprises estimating each data-bearing subcarrier of the OFDM channel.

5. The method of claim 1, wherein the channel is a WiFi™ channel, and
    wherein the analyzing of the measured differences further comprises sampling beacon frames that are transmitted at approximately regular intervals by an Access Point.

6. The method of claim 1, wherein the analyzing of the measured differences further comprises detecting a threshold value of the channel and detecting time instances where channels are closest to the threshold.

7. The method of claim 1, wherein the analyzing of the measured differences further comprises detecting instances where the channel, or at least one of a plurality of channels having comparable characteristics, is coming out of a fade or crossing a threshold with a positive gradient.

8. The method of claim 7, the method further comprising:
    collecting timestamps and distance magnitudes from the threshold for each detected instance.

9. The method of claim 8, the method further comprising:
    relaying the collected timestamps and distance magnitudes to a transmitting device.

10. The method of claim 9, wherein the transmitting device determines the time-varying nature of the channel based on the collected time stamps and distance magnitudes over time and decides on whether or how often to use mid-ambles in transmissions.

11. The method of claim 9 wherein the relaying of the collected timestamps and distance magnitudes is performed via dedicated management packets over an uplink channel.

12. A Doppler estimator for data packets to be received over a time-varying transmission medium, comprising:
a receiver configured to receive a first plurality of data packets over a downlink channel of the time-varying transmission medium;
a processer configured to analyze the received first plurality of data packets for at least one of constructive or destructive superposition as a function of time, predict a condition of the downlink channel for a subsequent transmission interval based on the analysis, and estimate whether the time-varying nature of the downlink channel is likely to be one of low, high, or very high based on the prediction; and
a transmitter configured to construct a mid-amble periodicity request based on the estimated nature, and transmit the constructed request over an uplink channel of the time-varying transmission medium;
wherein the receiver is further configured to receive a second plurality of data packets over the downlink channel, at least one of the second plurality comprising a mid-amble responsive to the transmitted request;
wherein the processor is further configured to compensate at least the second plurality of data packets for Doppler shift based on the mid-amble; and
wherein the processor is further configured to analyze by sampling a channel magnitude at substantially regular time intervals, setting a threshold magnitude relative to a mean magnitude, identifying positive-going threshold crossings, and measuring for the positive-going threshold crossings a magnitude difference between the sampled channel magnitude and the threshold magnitude.

13. The Doppler estimator of claim 12 wherein:
the receiver comprises a coherent modem receiver sampling the downlink channel by channel estimation processing,
the downlink channel is an orthogonal frequency-division multiplexing (OFDM) channel, and
at least one of the receiver or the processor is configured to estimate each data-bearing subcarrier of the OFDM channel.

14. The Doppler estimator of claim 12 wherein:
the receiver is configured to take samples as a function of time as new packets are received,
the downlink channel is a WiFi™ channel, and
at least one of the receiver or the processor is configured to sample beacon frames that are transmitted at approximately regular intervals by an Access Point, detect a threshold value of the downlink channel, and detect time instances where channels are closest to the threshold.

15. The Doppler estimator of claim 12 wherein at least one of the receiver or the processor is configured to detect instances where the downlink channel, or at least one of a plurality of channels having comparable characteristics, is coming out of a fade and crossing a threshold with a positive gradient.

16. The Doppler estimator of claim 15 wherein at least one of the receiver or the processor is configured to collect time stamps and distance magnitudes from the threshold for each instance.

17. The Doppler estimator of claim 16 wherein the transmitter is configured to relay the collected time stamps and distance magnitudes to an access point.

18. The Doppler estimator of claim 17 wherein the access point is configured to determine the time-varying nature of the channel based on the collected time stamps and distance magnitudes to fine-tune the periodicity of mid-ambles in transmissions.

19. The Doppler estimator of claim 17 wherein the transmitter is configured to relay using dedicated management packets over the uplink channel.

20. A program storage device tangibly embodying a non-transitory program of instructions executable by a processor to implement Doppler estimation for a signal to be received over a time-varying transmission medium, the program instructions comprising:
receiving the signal over a channel of the time-varying transmission medium;
sampling a magnitude of the received signal repeatedly over time;
identifying unidirectional threshold crossings based on the sampled magnitude;
measuring differences between the sampled magnitude and a threshold magnitude for the identified crossings;
analyzing the measured differences over time;
estimating the time-varying nature of the channel based on the analyzed differences; and
transmitting a signal indicative of the estimated time-varying nature.

* * * * *